L. N. MORSCHER.
AUTOMATIC LIQUID WEIGHING APPARATUS.
APPLICATION FILED JUNE 10, 1913.

1,154,042.

Patented Sept. 21, 1915.
4 SHEETS—SHEET 1.

Witnesses
Frank A. Fahle
Josephine Gasper

Inventor
Lawrence N. Morscher.
By Arthur M. Hood
Attorney

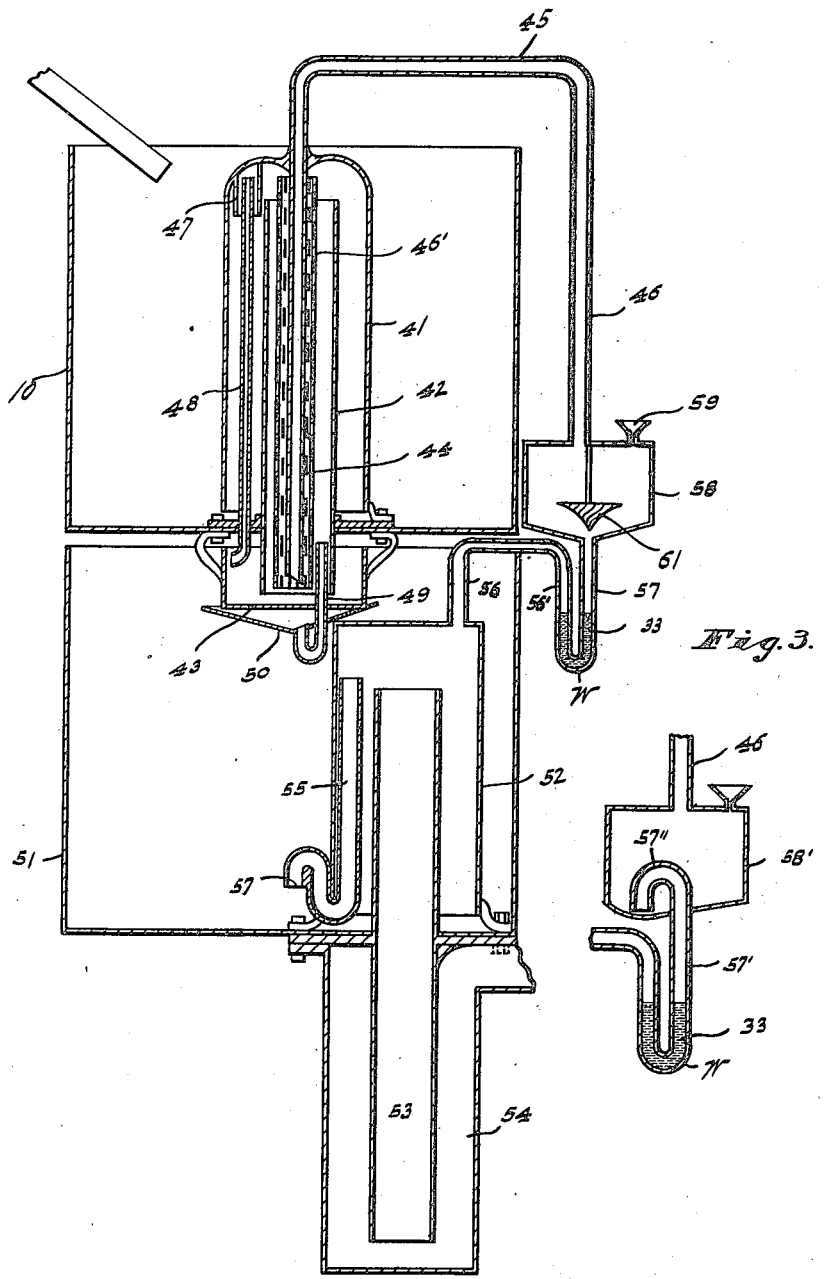

L. N. MORSCHER.
AUTOMATIC LIQUID WEIGHING APPARATUS.
APPLICATION FILED JUNE 10, 1913.
1,154,042.
Patented Sept. 21, 1915.
4 SHEETS—SHEET 3.
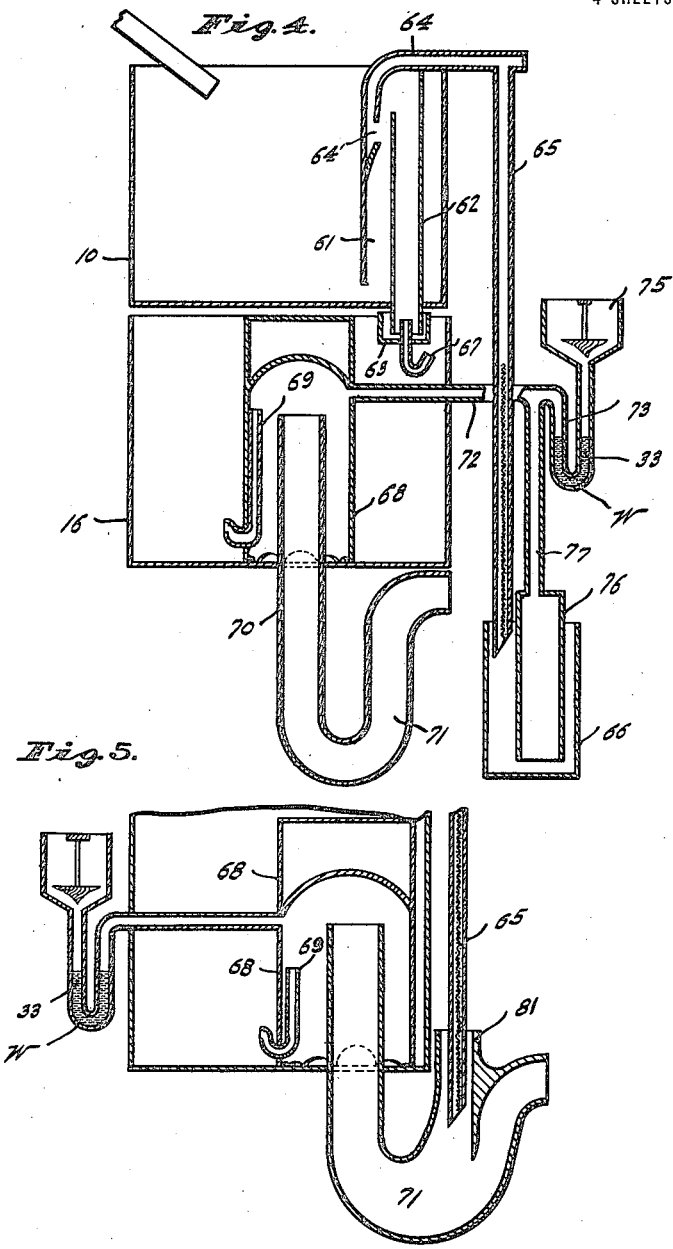
Witnesses
Frank A. Fahle
Josephine Gasper
Inventor
Lawrence N. Morscher,
By Arthur M. Hood
Attorney

UNITED STATES PATENT OFFICE.

LAWRENCE N. MORSCHER, OF LAWRENCE, KANSAS, ASSIGNOR TO HIMSELF AND IRVING HILL, A COPARTNERSHIP.

AUTOMATIC LIQUID-WEIGHING APPARATUS.

1,154,042.   Specification of Letters Patent.   Patented Sept. 21, 1915.

Application filed June 10, 1913. Serial No. 772,860.

*To all whom it may concern:*

Be it known that I, LAWRENCE N. MORSCHER, a citizen of the United States, residing at Lawrence, in the county of Douglas and State of Kansas, have invented a new and useful Automatic Liquid-Weighing Apparatus, of which the following is a specification.

The object of my invention is to produce an apparatus by means of which liquids of any specific gravity may be accurately and automatically weighed in successive equal quantities and discharged from the apparatus, such action being independent of variations in rate of delivery to the apparatus and being also independent of variations in specific gravity of the liquid which is being handled.

My apparatus involves the utilization of automatically operating siphons and I am aware that automatically operating siphons have heretofore been produced in order to provide for the successive and automatic siphoning discharge of liquids but, so far as I am informed such devices have all depended upon the sealing value of the liquid being handled and the automatic action thereof has therefore been variable in proportion to the variation in specific gravity of the liquid being handled. Consequently such devices are incapable of delivering successive quantities of liquid unvarying in weight.

The accompanying drawings illustrate, rather diagrammatically, embodiments of my invention, no attempt being made to define accurately, by drawings, the relative proportions of the various parts, as those proportions can be very readily determined for each particular case, upon an understanding of the description which follows.

Figure 1:
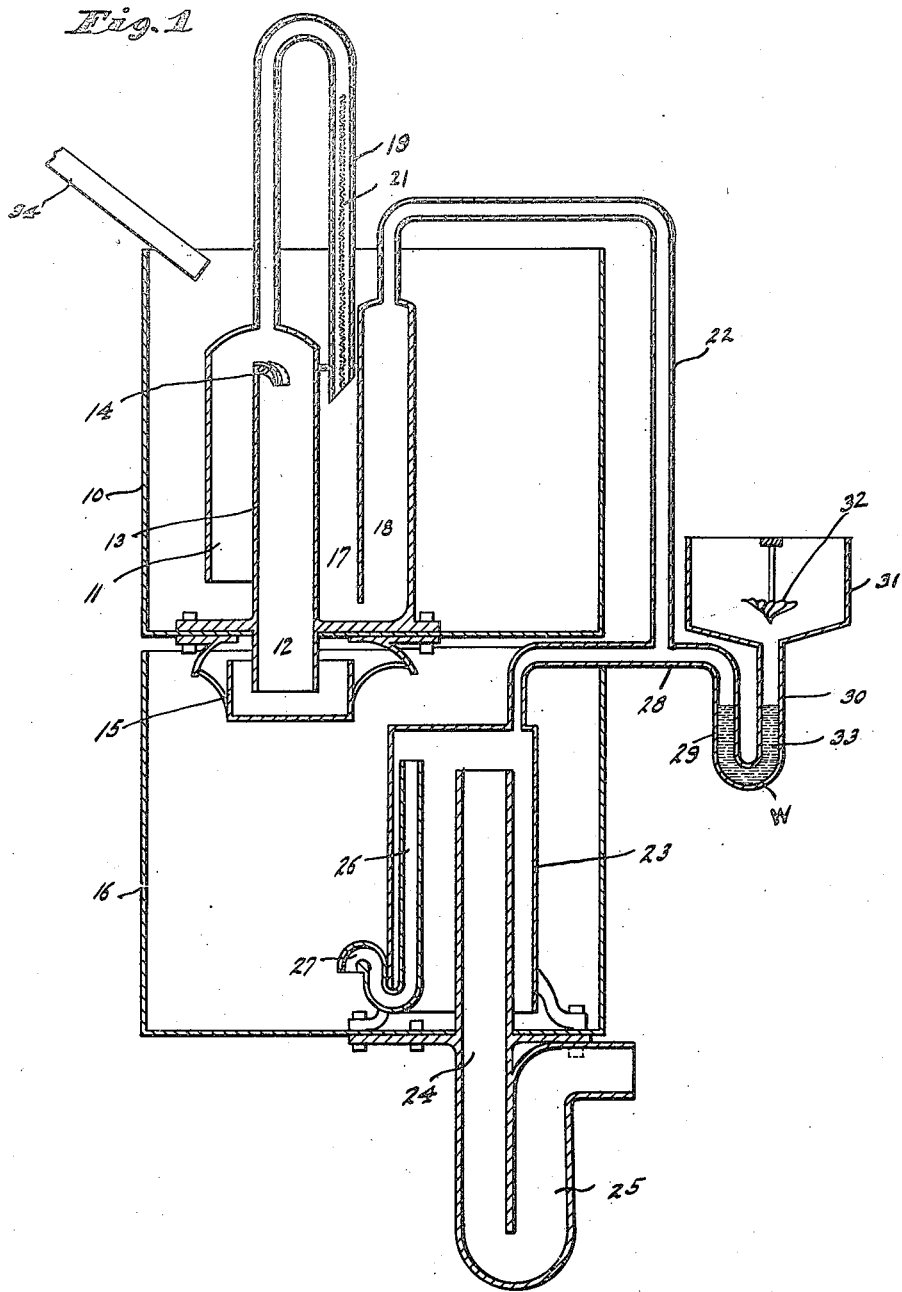
Figure 6:
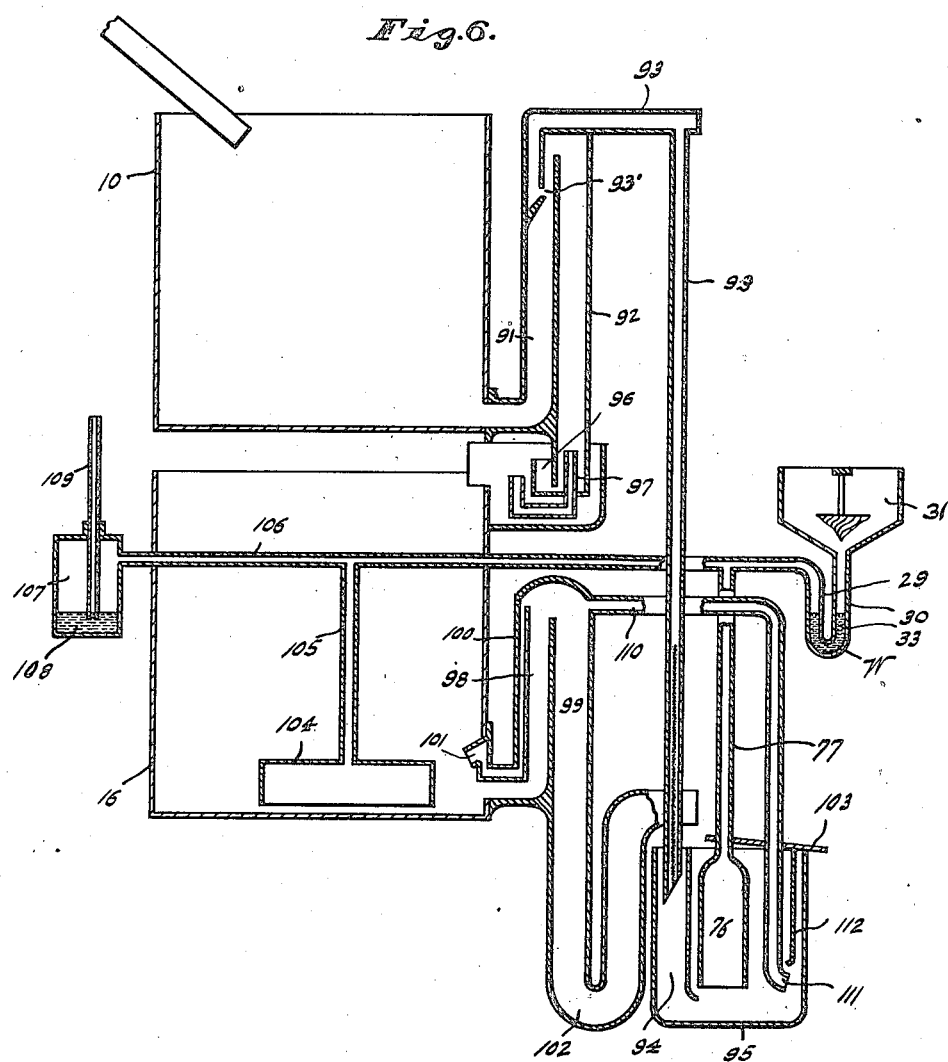

Figure 1 is a central vertical section of an apparatus embodying my invention; Fig. 2 a similar view of another form; Fig. 3 a fragmentary vertical section of a modified form of the portion of the apparatus provided for containing the weight-determining liquid; Fig. 4 a central vertical section of another form; Fig. 5 a fragmentary section of another form; Fig. 6 a central vertical section of another form.

Referring particularly to Fig. 1, 10 indicates a primary receiving tank in which is arranged a delivery siphon comprising the up-flow leg 11 and the down-flow leg 12, these two legs being separated by a partition 13 which at its upper edge and within the down-flow leg is provided with a serrated delivery lip 14 over which the liquids flow in passing into the down-flow leg. The up-flow leg 11 begins at a point a short distance above the bottom of tank 10 and the down-flow leg is projected through the bottom of said tank 10 and down into a sealing cup 15 which is arranged within the measuring chamber 16 in such manner that flow from the sealing cup 15 will be into tank 16. Also located within tank 10 is a U-shaped seal comprising the legs 17 and 18 which are connected at their lower ends. The upper end of the leg 17 is open and lies below the maximum liquid level to be attained in tank 10 and into the upper end of this leg 17 is projected the lower end of a vent passage 19 which is in the form of an inverted U the other leg of which communicates with the upper ends of the two passages 11 and 12, the middle of the U extending above any possible liquid level in tank 10. The longer leg of passage 19 projects only slightly into the upper end of leg 17 and is preferably beveled or inclined at its end. Arranged within this longer leg of passage 19, extending upwardly from the beveled lower end, is a perforated or reticulated partition 21 which extends upwardly to a point above any liquid level within tank 10. This perforated or reticulated partition 21 when wet retards or prevents the passage of air bubbles laterally therethrough but offers practically no material resistance to lateral flow of liquid, thus making it possible for air, entering into the shorter side of the beveled lower end of the passage, to pass readily upwardly into the passage 19 without interfering with the downward flow of liquid on the other side of the perforated partition. It will be readily understood that the partition 21 may be either a partition diametrically across passage 19, or may take some other desired form. Communicating with, or forming a continuation of, the upper end of the leg 18 is an inverted U-shaped passage 22 the middle of which is carried above the maximum liquid level within tank 10. Arranged within tank 16 is a bell 23 which lies over the discharge pipe or passage 24. The upper end of passage 24 begins at a point in the upper part of bell 23 and the lower part is formed into a liquid seal 25. Arranged within bell 23 is a vent tube 26 the upper end of which lies within bell 23 at a point above the upper end of discharge passage 24 and the lower end of which is formed into a liquid seal the open end of which is turned downwardly as at 27, in a plane somewhat above the plane of the lower open end of bell 23. Extending from the upper end of bell 23 is a passage 28 which connects with the upper end of one leg 29 of the weight-determining-liquid container W, the other leg 30 of said container W delivering into a separator box or container 31 in which is conveniently mounted, immediately above the upper open end of the leg 30, a spiral deflector 32, the purpose of which will appear. The lower end of the passage 22 is connected with passage 28 and it is desirable that, at some point between this point of connection and bell 23, the passage 28 be of less area than the minimum area of passage 22 in order that flow from bell 23 through passage 28 may be a little less free than flow through passage 22. This is conveniently accomplished by making the initial end of passage 28 of less diameter than passage 22. Trap 25 is made of such depth that it will not yield as readily to pressure as will the trap produced by the two legs 29 and 30.

In operation:—cup 15 and trap 25 will be filled, and tubes 17 and 18, if desired, partly filled, with the liquid which is to be handled and the container W will have placed within it a sufficient quantity of the liquid which is to determine the weights of successive quantities or portions of liquid to be discharged through the apparatus, this measuring liquid remaining constant in both quantity and quality. For this purpose I find it usually most convenient to employ a quantity of mercury 33. Thereupon the liquid to be measured is delivered to tank 10 by any suitable means, for instance through pipe 34 through which a continuous stream may be delivered if desired. As the liquid rises within tank 10 it will rise freely within the passage 11 to the level of the upper end of leg 17, which lies below the upper edge of partition 13, and when such level is reached will overflow into leg 17 and fill legs 17 and 18 to this level if they are not already so filled. When the liquid has risen in leg 17 to a point almost filling this leg the lower end of tube 19 will be closed by the liquid and thereafter the rise of liquid within the up-flow passage 11 will be slower than the rise of liquid within tank 10, the liquid still continuing to rise in leg 18 substantially as rapidly as in tank 10, but finally, when the level of liquid in tank 10 has become considerably higher than the upper end of partition 13, the liquid level in passage 11 will reach the top of said partition and some of the liquid will begin to flow over the upper end of said partition and downward off of the serrated lip 14 into the down-flow leg 12, entraining air with it, and this liquid, together with the entrained air will flow downwardly in cup 15 and from thence overflow into tank 16. As this entrainment of air continues the liquid will be drawn upwardly in the longer leg of tube 19 from leg 17. Instead of this trickling action there may be, due to the increase of pressure in the siphon 11—12, an ultimate breaking down of the seal in cup 15 and in either case, either by breaking down the seal in cup 15 or by gradual absorption within the legs 11—12, these legs 11—12 automatically become a siphon for the liquid in tank 10 and this liquid flows down through seal cup 15 and into tank 16. When the liquid rises within tank 16 to a point high enough to close end 27 of the vent 26, the air within bell 23 and passages 28 and 22 and leg 18 becomes compressed so as to gradually drive the liquid from leg 18 into leg 17 and from thence out over the top of leg 17 into tank 10, the lower end of tube 19 remaining sealed during this time and liquid being drawn up into it by reason of the decreased pressure at the top of legs 11 and 12 because of the fall of liquid in tank 10. In the meantime the weighing liquid 33 is displaced from leg 29 into leg 30 and some of the sealing liquid in trap 25 is also displaced. Before the level of liquid in tank 10 reaches the lower end of leg 11 the rise of liquid in tank 16 will have been sufficient to have increased the pressure in leg 29 to a point where suddenly the weighing liquid in the receiver W gives way and is pushed upwardly through leg 30 into contact with the deflector 32 which gives it a sufficient spiral movement to set it whirling within receiver 31 around the upper open end of tube 30, thus suddenly relieving the pressure in bell 23 and in passages 28 and 22 and leg 18. Because of the restricted character of the inlet end of passage 28, the first action resulting from this sudden release of pressure is to permit a sudden drop of liquid level in leg 17 and as soon as the upper portion of the open lower end of tube 19 is uncovered, by the lowering of level of liquid in leg 17, air will pass up through tube 19, without interfering with the down-flow of liquid from said tube because of the perforated partition 21, and thus break the siphoning action of the siphon 11—12. Immediately following the breaking of this siphoning action from tank 10, the release of pressure in bell 23 will also produce a surging of the liquid through said bell and into discharge passage 24, thus making a siphon of the bell and passage, whereupon outflow is established from tank 16. The rotation caused by the spiral deflector 32 keeps the weighing liquid 33 from dropping back into the legs 29 and 30 for an appreciable time, thus allowing the complete release of pressure in the leg 18 and bell 23, but allows such liquid to drop back into the legs 29 and 30 by the time such pressure is completely released, thus making the weighing liquid seal ready for another action. The outflow from tank 16 continues until the end 27 of vent 26 is opened by the lowering of level of liquid, whereupon the siphon 23—24 is broken by inflow of air through vent 26, and flow from tank 16 is discontinued. In the meantime tank 10 has been re-filling preparatory to another discharing action. The operations above described are repeated automatically as long as liquid is supplied to the tank 10, and, as the quantity and quality of the weighing material 33 remains constant, the weights of successive quantities of liquid discharged from tank 16 will be uniform irrespective of the quality or density of liquids delivered to the apparatus and also irrespective of the rate of delivery.

In the form shown in Fig. 2 I arrange within the tank 10 a bell 41 the lower end of which lies close to the bottom of tank 10. Arranged within this bell 41 is a discharge tube 42 the upper end of which lies near the top of the bell and the lower end of which is projected through the bottom of tank 10 and into the upper end of the sealing cup 43. Projected downwardly through the top of bell 41 is the leg 44 of an inverted U-shaped vent pipe 45 having a companion depending leg 46. The leg 44 is projected downwardly into the sealing cup 43 and is surrounded by a perforated or reticulated tube 46' which begins at the lower end of the leg 44 and ends at a point in the upper end of bell 41 above the upper end of tube 42. Arranged within bell 41 is a small supplementary bell 47 the lower end of which lies below the upper end of tube 42. Projected into bell 47 is a vent tube 48 which is extended downwardly through the bottom of tank 10 and projected into the upper part of the sealing cup 43 above the lower end of the discharge tube 42. Arranged in the lower end of tube 42 and projected through the bottom of the sealing cup 43 is the longer leg of a sealing tube or starting trap 49 the shorter leg of which is presented upwardly beneath the bottom of cup 43 at the lower edge of a plate or trough 50 which is extended out beyond the cup 43 so as to receive the early drip or discharge therefrom and carry it back to the trap 49. Arranged beneath tank 10, so as to receive the over-flow from cup 43, is the measuring tank 51 within which is mounted a bell 52 having its open lower end close to the bottom of tank 51. Projected through the bottom of tank 51 is the discharge pipe 53 the upper end of which lies in the upper part of bell 52 and the lower edge of which is projected down into the discharge trap 54. Arranged within bell 52 is a vent tube 55 similar to vent tube 26 (Fig. 1) and having its downwardly presented open end 57 in a plane somewhat above the lower open end of the bell 52. Leading from the upper end of bell 52 is a passage 56 which is connected to the upper end of one leg 56' of the trap-like receiver W, the other leg 57 opening into the hopper-like bottom of the chamber 58 into the upper end of which the leg 46 of the vent passage 45 is led. The upper part of chamber 58 is vented by a very small vent passage 59. Arranged in chamber 58 above the open upper end of leg 57 of receiver W is a deflector 61 similar to deflector 32 (Fig. 1).

In operation:—cup 43, trap 49 and trap 54 will be filled with the liquid to be measured and receiver W will be filled with a sufficient quantity of the measuring liquid 33. Thereupon liquid delivered into tank 10 will rise in said tank and in the bell 41, the bell being vented through tube 48 until the lower end of the bell 47 is closed. Thereupon further rise of level in tank 10 will compress the air within the upper part of bell 41 and within the discharge tube 42 thus exerting a pressure upon the liquid within starting trap 49 and whenever the pressure has increased sufficiently the liquid within the starting trap 49 will be blown out and thereupon the liquid in tank 10 will surge over into tube 42 and thus make a siphon of bell 41 and tube 42, the water within tank 10 flowing therethrough and through cup 43 into tank 51 and the starting trap 49 being refilled by such flow. The drip from cup 43 upon platform 50 also insures a proper refilling of the starting trap 49. As the liquid rises in tank 51 it first seals vent 55 at the point 57 and further rise of the liquid in tank 51 compresses the air within bell 52, and, as trap 54 is of greater resistance than the counterpoise 33 in receiver W, the counterpoise will give way upon a predetermined compression and be blown up into receptacle 58 in the manner already described, thus relieving the pressure in bell 52 and causing the liquid in tank 51 to surge over into the outlet pipe 53, whereupon it will be siphoned out. The discharge of compressed air into chamber 58 through passage 56 will be transmitted through vent 46—45—44 and will bubble up within the guard 46' so as to break the siphon 41—42 because the opening 59, while large enough to normally maintain atmospheric pressure in chamber 58, is not sufficient to suddenly accommodate the increased pressure delivered through the receiver W. Instead of depending upon gravity to return the counterpoise material to receiver W this return may be made in the manner illustrated in Fig. 3 where the upper end of leg 57' is provided with a goose-neck 57" lying close to the bottom of receptacle 58' in such manner that, as soon as the pressure coming from bell 52 is relieved, the counterpoise material will be sucked back through the goose-neck and into the receiver W.

In the form shown in Fig. 4 the tank 10 has a siphon comprising the up-flow leg 61 and the down-flow leg 62, said down-flow leg projecting through the bottom of tank 10 and delivering into the sealing cup 63. The air vent passage 64 communicates with the up-flow leg 61 of the siphon at the point 64' which is below the top of the partition between the two legs 61 and 62 and this passage 64 is in part formed in a depending leg 65 the lower open end of which is dipped into the sealing pot 66. Projected through the bottom of the sealing cup 63 is a starting trap 67 very similar to the starting trap 49 of the structure shown in Fig. 2, the upper and longer leg of this starting trap projecting into, or at least arranged in the line of, the down-flow leg 62 of the siphon 61—62. The sealing cup 63, as well as the starting trap 67 delivers to the measuring tank 16 and arranged in this tank is the bell 68 which has its open lower end near the bottom of tank 16. Bell 68 is vented by a vent 69 similar to the vent 26 of Fig. 1 and leading out from bell 68 is the discharge pipe 70 which delivers through the trap 71. The delivery end of trap 71 is so arranged that at least a part of the delivery will fall into the sealing pot 66. Leading from the upper part of bell 68 is a passage 72 which is connected to one leg 73 of the counterpoise receiver W, the other leg of said receiver delivering into the chamber 75 which is like chamber 31. Arranged within the sealing pot 66 is a bell 76 which is connected with passage 72 by passage 77. In this construction, cup 63 and traps 67, 71 and 66 are filled with the liquid to be handled. Rise of level of material in tank 10 will continue freely until port 64' is closed, whereupon further rise will compress the air within the down-flow leg 62 of the siphon until the starting trap 67 is blown out, thus causing the liquid to surge into the down-flow leg 62 and flow from thence into tank 16. A rise of liquid in tank 16 will first close the inlet end of the vent 69 and will then compress the air within bell 68 until the counterpoise material is blown into chamber 75 thus relieving the pressure and starting the siphon 68—70. Before the counterpoise material is blown out of receiver W the increase in pressure in passage 72 results in increase of pressure in bell 76 and this causes a discharge of material from the trap 66 but as soon as this pressure is relieved the level of liquid in trap 66 drops below the inlet end of leg 65 of the vent passage 64 and thus admits air through port 64' into the siphon 61—62 so as to break the siphoning action from tank 10. Instead of providing the sealing pot 66 the arrangement shown in Fig. 5 may be adopted. The construction of parts is the same as the corresponding parts shown in Fig. 4 except that the trap 71 is provided with a sump 81 into which the lower end of leg 65 is projected and in this arrangement there is no need of parts corresponding to 76 and 77 in the form shown in Fig. 4.

In the form shown in Fig. 5, accumulating pressure in bell 68 gradually drives a part of the sealing fluid in trap 71 out so that, when the counterpoise liquid in W blows, the reduced pressure in 68 will allow the liquid in 71 to drop back and uncover the lower end of leg 65 thus admitting air into the siphon 61—62. In this form the parts may be so proportioned that the siphon 61—62 may be broken by admission of air through leg 65 much more quickly after the time of ejection of the counterpoise material from the receiver W, than is possible in the other forms given.

In the form shown in Fig. 6 the tank 10 delivers to the up-flow leg 91 of the discharge siphon having the down-flow leg 92. This siphon is vented by a passage 93 having a port 93' at a point below the upper end of the up-flow leg 91. The lower end of passage 93 extends into an upstanding leg or passage 94 formed in sealing pot 95, said leg communicating with the main part of the pot near its bottom. The down-flow leg 92 of the siphon 91—92 delivers into the sealing cup 96 and is provided with a starting trap 97 like the trap 67. Both the sealing cup 96 and the starting trap 97 deliver into the measuring tank 16. Leading from tank 16 near its bottom is the up-flow leg 98 of a siphon having a down-flow leg 99 and this siphon is vented by vent passage 100 the inlet end 101 of which communicates with tank 16 at a point considerably above its bottom. The down-flow leg 99 delivers through the trap 102 and the delivery end of said trap is projected over pot 95 beyond the passage 94 to discharge mostly upon a delivery plate 103 which guards the pot 95 against the major portion of the flow from 102 but permits drippage into the pot. Arranged in the bottom of tank 16 below the level of opening 101 is a bell 104 which may be of considerable diameter but should be of less height than the distance between vent 101 and the bottom of tank 16. Bell 104 is connected by a passage 105 with the leg 29 of the receiver W for the counterpoise material, the other leg 30 being connected to the chamber 31. Arranged within the main part of pot 95 is a bell 76 connected by a pipe 77 with passage 105. Passage 106 connects passage 105 with an air inlet seal chamber 107 within which is sealing liquid 108, and dipping into liquid 108 is the air inlet vent pipe 109 which is of much less diameter than chamber 107. Leading from the upper end of siphon 98—99 is a passage 110 which is in part formed of a depending leg which is projected down into pot 95 and is provided with outlet end 111 which is turned in such way as to deliver into up-flow passage 112 formed in pot 95.

In operation:—the rise of liquid in tank 10 first seals port 93′ and then ejects the material from the starting trap 97 whereupon the flow is established through the siphon 91—92 in the manner already described, the discharge flowing into tank 16. The accumulating liquid in tank 16 compresses the air in bell 104 which in turn compresses the air in bell 76 and causes pot 95 to overflow and this pressure is almost sufficient to produce discharge from the passage 110. Further rise of liquid in tank 16 increases the pressure in bell 104 sufficiently to blow the counterpoise liquid from receiver W into chamber 31 thus relieving the pressure in bell 76 so as to allow the liquid in pot 95 to descend and uncover the lower end of passage 93 so as to admit air into the siphon 91—92 and stop its action. This lowering of level of the liquid in pot 95 also decreases the resistance at point 111 and thus permits the air pressure in the upper part of siphon 98—99 to flow out through passage 112 and permits the liquid in tank 16 to surge over from leg 98 into leg 99 and from thence pass out through trap 102. The first discharge from trap 102 will carry any sediment in it over the plate 103 and thus leave only the clear liquid resulting from a slower flow to drop into the pot 95 and thus restore the parts to initial operative position. As soon as the pressure in bell 104, and the connected parts, is released air may enter tube 109 and pass thence through the sealing liquid 108 into chamber 107 and the associated parts.

Various other modifications might be illustrated and described in order to show that my invention may take a very considerable number of forms without however departing from the fundamental features thereof. A sufficient number of forms has been shown, however, to indicate the general character of the invention which resides primarily in the provision of an automatic siphon delivery for a receiving tank the siphon action of which is established and disestablished by the blowing of a liquid seal which is not dependent upon or reestablished by the liquid which is being handled. Coupled with this fundamental feature of my invention in order to make the apparatus entirely automatic and continuous in its operation, is a supply tank the flow from which is controlled by an automatic siphon structure the venting of which is controlled by the action of the measuring apparatus.

I claim as my invention:

1. In an apparatus of the class described, the combination of a receiving tank, an automatic siphon discharge therefor, a measuring tank arranged to receive the discharge from the first tank, a siphon discharge for the measuring tank, and a pressure-controlled venting-device associated with the measuring tank and with the siphon of the receiving tank and subjected to pressure produced by liquid within the measuring tank, whereby operation of the venting device due to increase of liquid within the measuring tank will break the siphon of the receiving tank and establish the siphon of the measuring tank.

2. In an apparatus of the class described, the combination of a receiving tank, an automatic siphon discharge therefor, a second tank arranged to receive the discharge from the first tank, an automatic siphon discharge for the second tank, a pressure-controlled venting-device independent of the density of the material passing through the tanks but pressure-controlled by the accumulation of material in the second tank, said venting device having a venting connection with the automatic siphon of the first tank.

3. In an apparatus of the class described, the combination of a receiving tank, an automatic siphon discharge therefor, a second tank arranged to receive the discharge from the receiving tank, a siphon discharge for the second tank, and a liquid-seal counterpoise interconnected with the siphon of the second tank and subjected to pressure of liquid within the second tank, said liquid-seal counterpoise also being connected to the siphon of the first tank to vent said siphon upon the release of the liquid-seal counterpoise.

4. In an apparatus of the class described, the combination of a receiving tank, an automatic siphon discharge therefor, a second tank arranged to receive the discharge from the receiving tank, a siphon discharge for the second tank, and a liquid-seal counterpoise subjected to pressure of the siphon of the second tank, said liquid-seal counterpoise also being connected to the siphon of the first tank to vent said siphon upon the release of the liquid-seal counterpoise.

5. In an apparatus of the class described, the combination of a receiving tank, an automatic siphon discharge therefor, a second tank arranged to receive the discharge from the receiving tank, a trapped siphon discharge for said second tank, and a liquid-seal counterpoise subjected to pressure of liquid within the second tank and connected to the siphons of both tanks, the connection between said liquid-seal counterpoise and the siphon of the first tank venting, said siphon upon the release of the liquid-seal counterpoise, and the connection between said liquid-seal counterpoise and the siphon of the second tank venting said last-named siphon to establish flow therethrough upon the venting of the siphon of the first tank.

6. In an apparatus of the class described, the combination of a tank, a siphon discharge therefor, and a vent for said siphon, said vent having associated therewith a perforated partition which when wet offers material obstruction to lateral flow of air therethrough but which offers no material obstruction to lateral flow of liquid therethrough, thereby forming a passage for the flow of venting air upwardly through downwardly flowing liquid.

7. In an apparatus of the class described, the combination of a tank, an automatic siphon discharge therefor, a second tank arranged to receive the discharge from the siphon of the first tank, a siphon discharge for the second tank, a vent tube connected to the first siphon, a liquid-seal for said vent tube, a liquid-seal counterpoise, and connections between one leg of said counterpoise and the seal of the said vent and a chamber subjected to the pressure of the contents of the second tank.

8. In an apparatus of the class described, the combination of a tank, an automatic discharge siphon therefor, a vent tube for said siphon, a liquid seal for said vent, a second tank arranged to receive the discharge from the first tank, an automatic siphon discharge for said second tank, a liquid-seal counterpoise, and a tube leading from the crown of the second siphon and connected with one leg of said liquid-seal counterpoise, the same leg of the counterpoise also being connected with the seal for the vent-tube of the first siphon.

9. In an apparatus of the class described, the combination of a tank, an automatic siphon discharge therefor, a second tank arranged to receive the discharge from the siphon of the first tank, a siphon discharge for the second tank, a vent tube connected to the first siphon, a liquid seal for said vent tube, a liquid seal counterpoise, a connection between one leg of said counterpoise and a chamber connected to the pressure of the contents of the second tank, and means whereby the quantity of the liquid seal for the vent tube is controlled by the operation of said liquid counterpoise.

10. In an apparatus of the class described, the combination of a tank, a siphon discharge therefor, and a vent tube having one end connected to said siphon and the other end extending downwardly, a reticulated partition dividing said vent tube at and near said downwardly extending end, said end extending further downward on one side of said partition than on the other, and a liquid seal into which said downwardly extending end projects.

11. In an apparatus of the class described, the combination of a tank, a siphon discharge therefor, and a vent tube having one end connected to said siphon and the other end extending downwardly, a partition dividing said vent tube at and near said downwardly extending end, said end extending further downward on one side of said partition than on the other, and a liquid seal into which said downwardly extending end projects.

12. In combination, a receiving tank, a measuring tank, a vented siphon having its inlet end within said receiving tank and its discharge end in position to discharge to said measuring tank, a vented siphon having its inlet end within said measuring tank and its discharge end in the form of a trap, a trap containing a liquid seal counterpoise having a smaller pressure head than the trap at the discharge end of said second siphon and having one leg connected to receive a pressure dependent upon the liquid head in said measuring tank, said connection having a part of its length above the maximum liquid level in said measuring tank, the vents of said siphons being connected to said trap for the liquid seal counterpoise so that said siphons are vented upon the blowing of said trap to cause the first siphon to cease operation and the second to commence operation, said first siphon starting operation when the liquid in said receiving tank reaches a predetermined level and said second siphon ceasing operation when the liquid in the measuring tank falls to a predetermined level.

13. In combination, a receiving tank, a measuring tank, a vented siphon having its inlet end within said receiving tank and its discharge end in position to discharge to said measuring tank, a liquid seal for the discharge end of said siphon, a vented siphon having its inlet end within said measuring tank, and its discharge end in the form of a trap, a trap containing a liquid seal counterpoise having a smaller pressure head than the trap at the discharge end of said second siphon and having one leg connected to receive a pressure dependent upon the liquid head in said measuring tank, the vents of said siphons being connected to said trap for the liquid seal counterpoise so that said siphons are vented upon the blowing of said trap to cause the first siphon to cease operation and the second to commence operation, said first siphon starting operation when the liquid in said receiving tank reaches a predetermined level and said second siphon ceasing operation when the liquid in the measuring tank falls to a predetermined level.

14. In combination, a receiving tank, a measuring tank, a vented siphon having its inlet end within said receiving tank and its discharge end in position to discharge to said measuring tank, a vented siphon having its inlet end within said measuring tank, and its discharge end in the form of a trap, a trap containing a liquid seal counterpoise having a smaller pressure head than the trap at the discharge end of said second siphon and having one leg connected to receive a pressure dependent upon the liquid head in said measuring tank, the vents of said siphons being connected to said trap for the liquid seal counterpoise so that said siphons are vented upon the blowing of said trap to cause the first siphon to cease operation and the second to commence operation, said first siphon starting operation when the liquid in said receiving tank reaches a predetermined level and said second siphon ceasing operation when the liquid in the measuring tank falls to a predetermined level.

15. In combination, a receiving tank, a measuring tank, a vented siphon having its inlet end within said receiving tank and its discharge end in position to discharge to said measuring tank, a vented siphon having its inlet end within said measuring tank and its discharge end in the form of a trap, a trap containing a liquid seal counterpoise having a smaller pressure head than the trap at the discharge end of said second siphon and having one leg connected to receive a pressure dependent upon the liquid head in said measuring tank, the vents of said siphons being connected to said trap for the liquid seal counterpoise so that said siphons are vented upon the blowing of said trap to cause the first siphon to cease operation and the second to commence operation, said first siphon starting operation when the liquid in said receiving tank reaches a predetermined level and said second siphon ceasing operation when the liquid in the measuring tank falls to a predetermined level, and a chamber into which said trap for the liquid seal counterpoise discharges when said trap blows and which returns the liquid seal counterpoise to said trap to restore said seal within a predetermined time.

In witness whereof, I, LAWRENCE N. MORSCHER, have hereunto set my hand at Lawrence, Kansas, this 26 day of May, A. D. one thousand nine hundred and thirteen.

LAWRENCE N. MORSCHER.

Witnesses:
HIRAM L. MOORE,
GEO. T. WETZEL.